(12) United States Patent
Nicolson et al.

(10) Patent No.: US 7,137,316 B2
(45) Date of Patent: Nov. 21, 2006

(54) SAW BLADES

(75) Inventors: Peter John Nicolson, East Sussex (GB); Paul Edward Duggan, Cambridge (GB)

(73) Assignee: C4 Carbides Limited, Cambridge (GB)

( * ) Notice: Subject to any disclaimer, the term of this patent is extended or adjusted under 35 U.S.C. 154(b) by 144 days.

(21) Appl. No.: 10/258,442

(22) PCT Filed: Apr. 30, 2001

(86) PCT No.: PCT/GB01/01882

§ 371 (c)(1),
(2), (4) Date: Dec. 4, 2002

(87) PCT Pub. No.: WO01/83143

PCT Pub. Date: Nov. 8, 2001

(65) Prior Publication Data

US 2004/0035253 A1 Feb. 26, 2004

(51) Int. Cl.
*B26D 1/00* (2006.01)
*B23D 61/04* (2006.01)
(52) U.S. Cl. .............. 76/80; 83/835; 83/846; 83/13; 76/112
(58) Field of Classification Search .......... 83/835, 83/846, 845, 13; 76/112, 80, 29; 29/432.2, 29/445, 558
See application file for complete search history.

(56) References Cited

U.S. PATENT DOCUMENTS

| 2,510,462 | A | * | 6/1950 | Christenson | 76/29 |
| 3,104,562 | A | * | 9/1963 | Kolesh | 76/112 |
| 3,589,215 | A | * | 6/1971 | Bullard | 76/112 |
| 4,810,143 | A | * | 3/1989 | Muller | 411/181 |
| 4,889,025 | A | * | 12/1989 | Collett | 83/835 |
| 5,427,000 | A | | 6/1995 | Hellbergh | |
| 5,743,163 | A | * | 4/1998 | Lavinder | 83/851 |
| 5,946,985 | A | * | 9/1999 | Carlsen et al. | 76/112 |
| 5,947,805 | A | * | 9/1999 | Van Osenbruggen | 451/358 |

FOREIGN PATENT DOCUMENTS

| EP | 0 361 875 | 4/1990 |
| GB | 763798 | 12/1956 |
| GB | 950902 | 2/1964 |

* cited by examiner

Primary Examiner—Boyer D. Ashley
Assistant Examiner—Omar Flores Sánchez
(74) Attorney, Agent, or Firm—Nixon & Vanderhye P.C.

(57) ABSTRACT

A saw blade is formed from a blank which has an edge. Inserts, such as tungsten carbide are inserted in apertures in the blank and a finishing cut is then made along the line to produce a series of teeth, each having a point within the body of the insert, and thus formed by the relatively hard material of the insert. Fingers of the inserts provide a root which holds the insert in position during use.

19 Claims, 3 Drawing Sheets

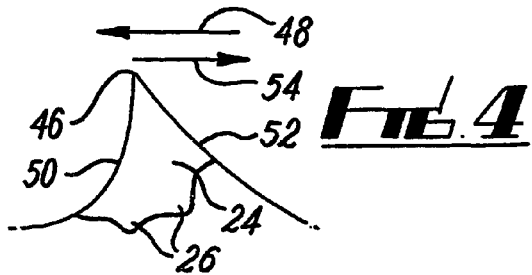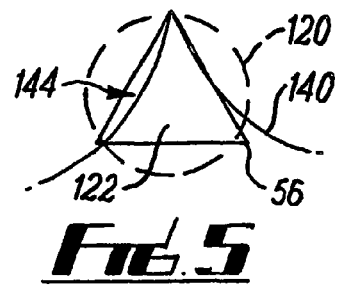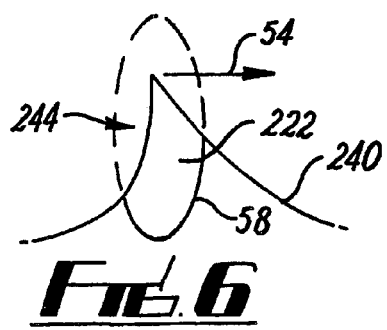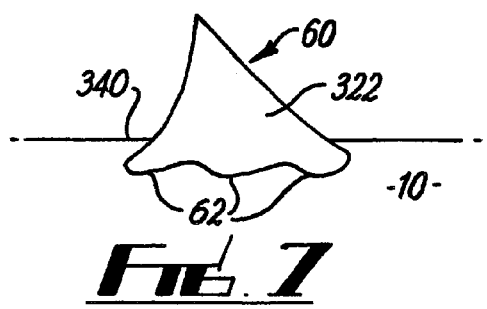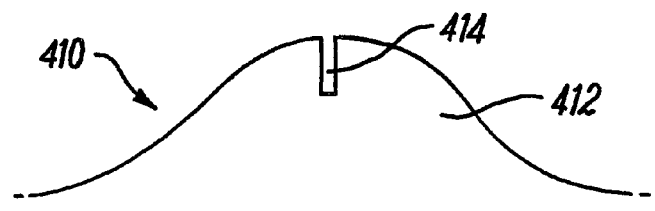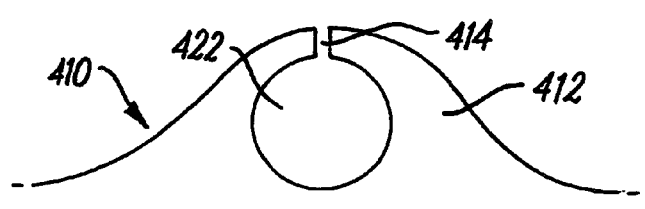

SAW BLADES

BACKGROUND AND SUMMARY OF THE INVENTION

This application is the U.S. national phase of international application PCT/GB01/01882 filed Apr. 30, 2001, which designated the U.S.

The present invention relates to saw blades and in particular, to a method of making a saw blade blank and a saw blade therefrom.

The invention provides a method of making a saw blade blank, in which at least one aperture is formed in a strip of relatively soft material and an insert of relatively hard material is fixed in the aperture, the insert causing material of the blank to be displaced as the insert is introduced, and material being removable from the edge of the blank to form a saw blade with a tooth, leaving at least part of the insert exposed to form a cutting portion of the tooth.

The aperture may be formed by the insertion of the insert, or may be formed prior to insertion of the insert.

Preferably the entire circumference of the aperture is spaced from the edge of the blank.

Preferably a plurality of apertures are formed for respective inserts. The apertures may be regularly spaced along the blank and may be equally spaced from the edge of the blank. Alternatively, the apertures may be spaced by different distances from the edge of the blank, to allow composite teeth to be formed with cutting portions at different separations from the body of the blank. The pitch of the apertures along the blank may vary along the blank.

The or each aperture may be circular. The insert may be non-circular. The insert may comprise a main body from which at least one projection extends, the projection serving to displace material of the strip when the insert is introduced, and thereafter to remain embedded within the material of the strip. Preferably a plurality of projections as aforesaid are provided on the insert. The projections may each have a convex extremity and be separated from neighbouring projections by a concave portion of the outline of the insert.

A portion of the outline of the insert may have the shape of the required cutting portion, prior to insertion. The aperture may open to the edge of the blank, the insert being positioned in the aperture to leave the shaped portion exposed.

Preferably at least one dimension of the insert is less than the corresponding dimension of the aperture in the plane of the blank, to cause a gap to be left between the blank and the insert when positioned in the aperture, the gap serving to receive additional material for fixing the insert in the aperture. The fixing material may be weld or brazing flux.

Preferably the inserts are tungsten carbide, and may be sintered. The blade may be steel.

The invention also provides a saw blade blank manufactured according to the method set out above.

The invention also provides a saw blade blank comprising a strip of relatively soft material, an aperture formed in the strip, an insert of relatively hard material fixed in the aperture and sufficiently large to cause material of the blank to be displaced by the introduction of the insert, whereby material may be removed from the edge of the blank to form a tooth, at least part of the insert being exposed in the finished blade to form a cutting portion of the tooth.

The blade blank may have any of the features set out above.

The invention also provides a method of making a saw blade from a saw blade blank manufactured according to the method as set out above, comprising removing material from the edge of the blank to form a tooth, at least part of the insert being exposed in the finished blade to form a cutting portion of the tooth.

The invention also provides a saw blade manufactured according to the method set out above.

The invention also provides a saw blade comprising a strip of relatively soft material, an insert of relatively hard material fixed in an aperture in the strip and sufficiently large to cause material of the blank to be displaced by the introduction of the insert, and the strip having material removed from its edge to form a tooth, at least part of the insert being exposed in the blade to form a cutting portion of the tooth.

The blade may have any of the features set out above.

BRIEF DESCRIPTION OF THE DRAWINGS

Examples of the present invention will now be described in more detail, by way of example only, and with reference to the accompanying drawings, in which:

FIG. 4 illustrates a finished tooth;

FIGS. 5–7 correspond with FIG. 2, showing alternative embodiments;

FIGS. 8A and 8B illustrate the formation of teeth with improved arrangements for introducing brazing flux or weld;

DETAILED DISCUSSION OF THE DRAWINGS

Figure 1:
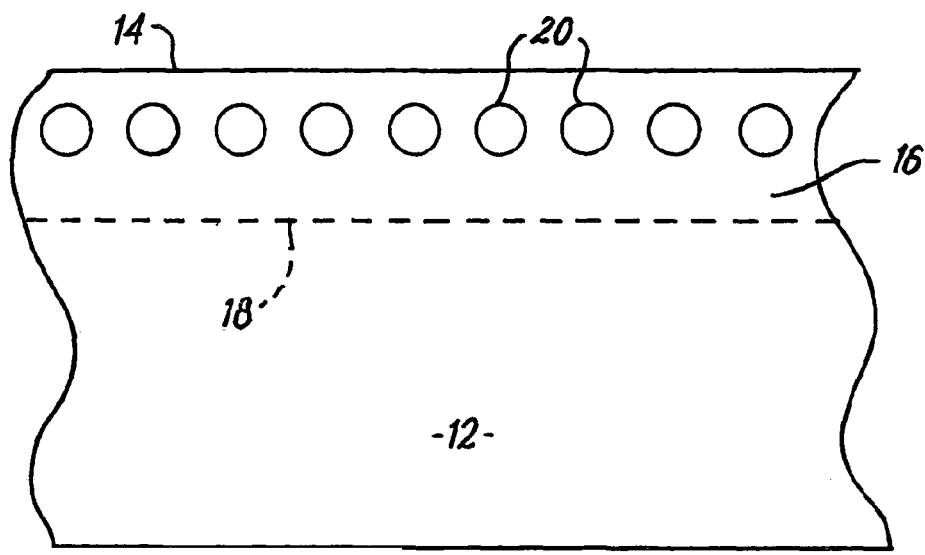
FIG. 1 is a schematic view of the face of a blade blank for use in making a saw blade.

FIG. 1 shows a blade blank 10 which has a body 12 and an edge 14. The blank 10 may be of uniform material, such as steel strip, or may be a bi-metallic strip having a body 12 of steel, and an edge strip 16 of tungsten steel, meeting the main body 12 at a line indicated at 18.

In this example, apertures 20 are pre-formed in the blank 10. In the event that the blank 10 is bi-metallic, the apertures 20 will be in the edge strip 16, for reasons which will become apparent. The apertures 20 are circular in this example, and are regularly spaced along the blank 10. The entire circumference of each aperture 20 is spaced from the edge 14, so that the aperture 20 is fully enclosed.

Figure 2:
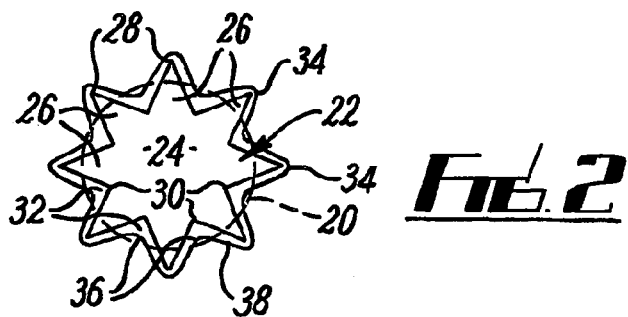
FIG. 2 illustrates, on an enlarged scale, an insert in an aperture of the blank of FIG. 1.

The apertures 20 are used to receive inserts of material which is hard relative to the remainder of the blank 10. An insert is illustrated in FIG. 2, on an enlarged scale. The insert 22 may, for instance, be of sintered tungsten carbide.

It can be seen from FIG. 2 that the insert 22 consists of a central body 24 from which eight tapering fingers 26 project, each finger 26 terminating in a convex point 28, and neighbouring fingers 26 being separated by concave portions 30 of the outline of the insert 22. The outline of the insert 22 is thus star shaped.

FIG. 2 also shows a circular broken line which indicates the initial size of one of the apertures 20. As can be readily seen, the maximum dimensions of the insert 22 exceed those of the aperture 20. That is, the overall diameter of the star shaped insert 22 is greater than the diameter of the aperture 20. However, it can also be seen that the minimum diameter of the insert 22, between concave portions 30, is less than the diameter of the aperture 20. In consequence, when the insert 22 is brought alongside the aperture 20, the points 28 will bear on the blank 10 around the aperture 20, initially preventing the insert 22 entering the aperture 20, but leaving gaps 32 between the concave portions 30 and the circumference of the aperture 20.

In order to proceed with the manufacture, the insert 22 is then forced into the aperture 20, such as by a punching operation. In bulk production, it may be desirable to insert a plurality of inserts in their respective apertures by a single punching operation. This operation forces the points 28 to displace material of the blank 10, the points 28 cutting their own notches 34 around the aperture 20 and causing some swaging of material at 36, between notches 34. After forcing the insert 22 into the aperture 20 in this way, the aperture 20 adopts a final outline 38, shown as a solid line in FIG. 2.

At this stage, the insert 22 will be mechanically retained in the aperture 20, by virtue of engagement between the points 28 and the notches 34, but retention can be improved by a brazing step, in which brazing flux (typically a ductile copper-based brazing flux) is introduced into the gaps 32 to form a series of brazed joints between the concave portions 30 and the swaged regions 36.

Figure 3:
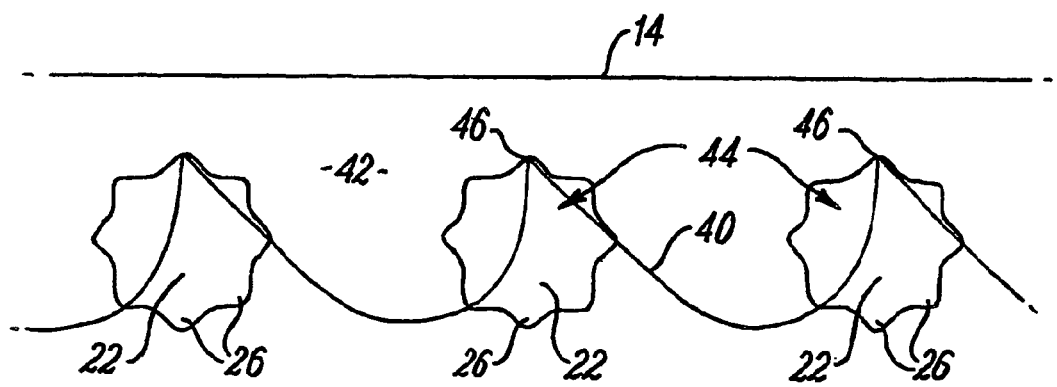
FIG. 3 shows the blank of FIG. 1, with inserts in each aperture, indicating the line of a finishing cut.

After installing an insert 22 in each aperture 20 in the manner just described, the blank 10 will then have the intermediate appearance shown in FIG. 3 and can then be completed by a finishing cut along the line 40, cutting away a region 42 of waste material. The thickness of the insert 22 in a direction perpendicular to the plane of the blank 10 is no greater than the thickness of the blank 10, so that several, preferably a large number, of blanks 10 can be arranged side-by-side and cut together to form the finishing cut simultaneously on each of these blanks, such as by a milling operation.

It is apparent from FIG. 3 that the cut 40 produces a series of teeth at 44, each having a point 46 within the body of the insert 22, and thus formed by the relatively hard material of the insert 22. One such tooth is shown in FIG. 4 on an enlarged scale, corresponding with FIG. 2. The tooth 44 in FIG. 4 is intended to cut when moving in the direction of the arrow 48 and has a relatively steep leading edge 50, rising to a point 46, and a less steep trailing edge 52. The upper part of the leading edge 50, the point 46 and the upper part of the trailing edge 52 are all formed solely by material from the original insert 22.

In the arrangement shown in FIG. 4, two fingers 26 remain unaffected by the finishing cut 40 and form a root which embeds the remainder of the insert 22 in the body 12. The root formed by the fingers 26 provides mechanical support against forces in the direction of the arrow 54, which will arise from engagement with a workpiece during use, and will seek to tear the insert 22 from the body 12. The non-circular shape of the original insert 22, and in particular the presence of the fingers 26, resists this tearing action. In addition, the remainder of the insert 22 is attached to the body 12 by the brazing operation, providing a second mechanism to resist tearing from the forces 54. Furthermore, the presence of brazing flux in the gaps 32 provides a cushioning effect between the insert 22 and the body 12, by virtue of the ductile nature of the flux. This has been found to assist in reducing vibration caused during use of the finished blade.

These effects of tooth retention can be achieved without needing any particular alignment of the insert when introduced into the aperture, which simplifies production. It is also apparent that the method does not require high precision in the production of the inserts or the apertures, so that manufacturing techniques can have significant tolerances without affecting the end result.

Many other combinations of shapes could be chosen for the aperture and insert, the final choice possibly depending in part on the final shape required for the teeth 44. FIGS. 5 and 6 show two other alternatives for forming a tooth of the same shape as the tooth shown in FIG. 4. In FIG. 5, a triangular insert 122 is punched into a circular aperture 120 before cutting along a finishing cut 140 to leave a tooth 144 having the same outline as the tooth 44, and a root formed by one corner 56 of the original triangle.

FIG. 6 illustrates an alternative using an oval or elliptical insert 222, with the major axis aligned perpendicular to the original edge 14 of the blank 10, and punched into an aperture (not shown) of different shape, such as circular. After cutting along the finishing cut 240, the tooth 244 has a rounded root provided by one end of the original ellipse or oval and having a steep rear wall 58, providing good mechanical resistance against the forces 54.

FIG. 7 shows a further alternative. In this case, the insert 322 is a complicated shape having a portion 60 which provides the final outline required in the tooth being formed, and having a plurality of fingers 62 embedded in the blank 10. With this example, the finishing cut 340 is required only to remove material of the blank 10, not material of the insert 322. This may be advantageous in facilitating cutting in view of the relative hardness of the insert material, which may require diamond cutters. However, this arrangement has the disadvantage of requiring the insert 322 to be correctly aligned when being punched into the blank 10.

FIGS. 8A and 8B illustrate a further possibility for using the present invention. In this example, the blank 410 is pre-cut to the final tooth shape, or to a shape close to the final tooth shape, leaving a tooth 412. At the peak of the tooth 412, a short slot 414 is formed, transverse to the blank 410, as shown in FIG. 8A. The insert 422 is then introduced, either by pre-forming an aperture, followed by insertion of the insert 422, or by punching the aperture as the insert 422 is introduced. The slot 414 then forms a capillary through which brazing flux can readily be introduced, to flow down the slot 414 and around the insert 422. The blank 410 can then be further machined to expose the insert 422 as part of the cutting portion of the tooth 412. It will be apparent from FIG. 8B that the amount of machining required after insertion of the insert 422 is much reduced.

Figure 9:
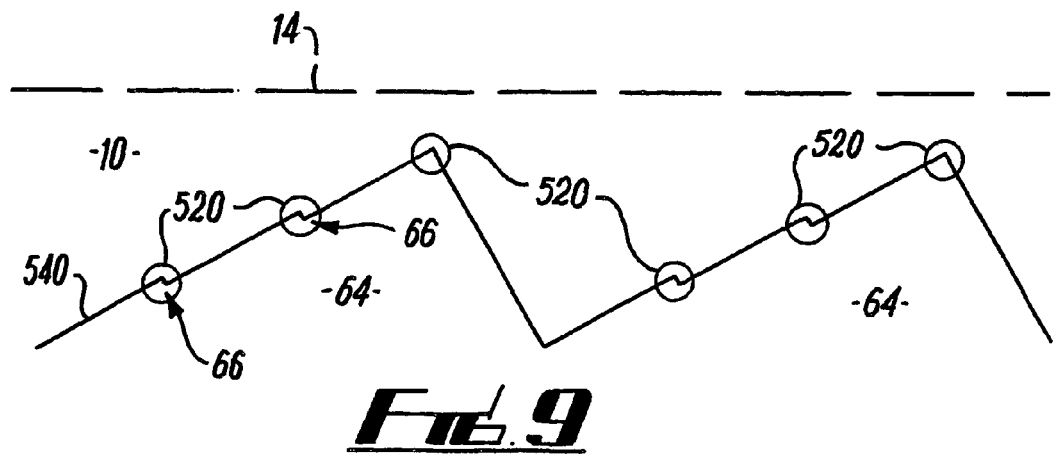
FIG. 9 is a highly schematic representation of an alternative line for a finishing cut.
Figure 10:
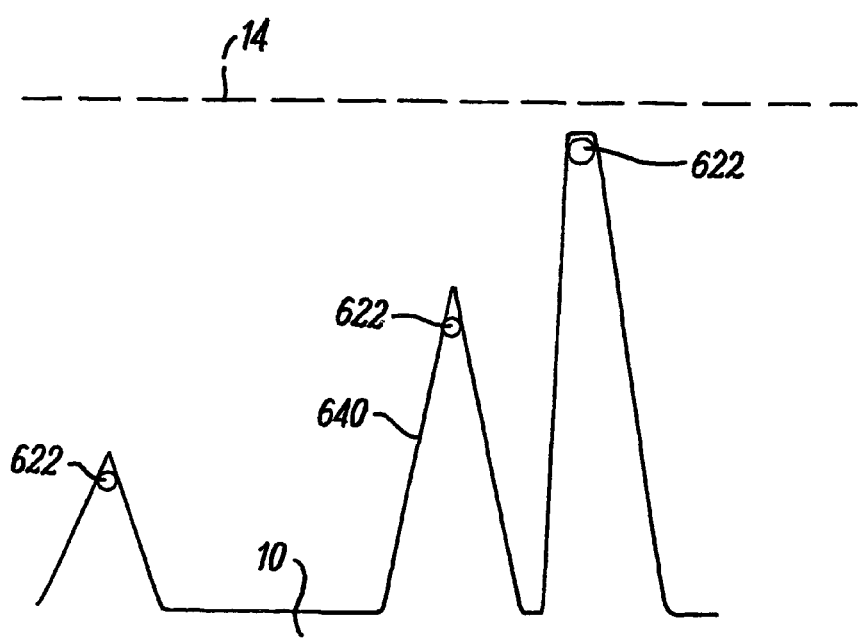
FIG. 10 illustrates a saw blade made according to the present invention and having varying tooth pitch and height.

FIG. 9 illustrates a further possibility for using the present invention. In this example, shown highly schematically, apertures 520 are provided at regular separations along the length of the blank 10, but at various different separations from the edge 14. This allows the finishing cut 540 to be more complex, providing large teeth 64, each formed as a series of small teeth 66 on the leading edge of the large tooth 64, each small tooth 66 being formed from the material of an insert in the manner described above. A further possibility is illustrated in FIG. 10. In this example, inserts 622 are provided at variable pitch along the length of the blank 10 and at various different separations from the edge 14. This allows the finishing cut 640 to produce a series of teeth which vary in pitch and height, having a tooth shape commonly termed "varipitch", with each tooth having an insert 622 forming part of the cutting portion of the tooth.

The description set out above has described the formation of a saw blade blank by the introduction of inserts into apertures pre-formed in strip, the blank then being finished by a finishing cut to produce the final tooth profile and expose the inserts. It may be possible to introduce inserts into strip in which apertures have not been formed, so that each insert displace material as it is introduced, forming the aperture and embedding itself in the blank. In some commercial situations, it may be desirable to sell the blank, with inserts in position, for subsequent finishing by the customer. In particular, it may be desirable to sell the blank in the form of a coiled strip which can then be finished on a conventional saw blade cutting machine, set so that each tooth is provided, at least in part, by an insert.

Many variations and modifications can be made to the examples described above, without departing from the scope of the invention. In particular, many different materials and combinations of materials could be used for the components. The detailed shapes and the sizes and relative sizes of the components can all be changed, particularly in view of the intended final tooth shape, and intended application of the blade being formed. The teeth formed as described above can be left unset, or can be set by mechanical deformation, or may be cut to form set teeth, such as by fleam-grinding. The examples described above have indicated that it is preferred to use a non-circular insert in a circular aperture, but it will be readily apparent to the skilled man that a circular insert could be used in a non-circular aperture.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of making a saw blade blank in which at least one aperture is formed in a strip of relatively soft material and a non-circular insert of relatively hard material is fixed in the aperture, the insert causing material of the blank to be displaced as the insert is introduced, and material being removable from the edge of the blank to form a saw blade with a tooth, leaving at least part of the insert exposed to form a cutting portion of the tooth, in which the insert comprises a main body from which a plurality of projections extend, the projections serving to displace material of the strip when the insert is introduced, and thereafter to remain embedded within the material of the strip, and in which the projections each have a convex extremity and are separated from neighbouring projections by a concave portion of the outline of an insert.

2. A method of making a saw blade blank according to claim 1, in which a portion of the outline of the insert has the shape of the required cutting portion, prior to insertion.

3. A method of making a saw blade blank according to claim 2, in which the aperture opens to the edge of the blank, the insert being positioned in the aperture to leave the shaped portion exposed.

4. A method of making a saw blade blank according to claim 1, in which at least one dimension of the insert is less than the corresponding dimension of the aperture in a plane of the blank, to cause a gap to be left between the blank and the insert when positioned in the aperture, the gap serving to receive additional material for fixing the insert in the aperture.

5. A method of making a saw blade blank according to claim 4, in which the fixing material is weld or brazing flux.

6. A method of making a saw blade blank according to claim 1, in which the inserts is tungsten carbide.

7. A method of making a saw blade blank according to claim 6, in which the inserts is sintered tungsten carbide.

8. A method of making a saw blade blank according to claim 1, in which the blade is steel.

9. A saw blade blank manufactured according to the method set out in claim 1.

10. A method of making a saw blade from a saw blade blank manufactured according to the method of claim 1, comprising removing material from the edge of the blank to form a tooth, at least part of the insert being exposed in a finished blade to form a cutting portion of the tooth.

11. A saw blade manufactured according to the method of claim 10.

12. A method of making a saw blade according to claim 1, wherein a slot is provided in the strip, the slot extending from the edge of the strip to one of the apertures to form a capillary through which additional material may flow for fixing the insert in the aperture.

13. A method of making a saw blade according to claim 12, wherein a respective slot as aforesaid is provided to each aperture.

14. A method of making a saw blade blank according to claim 1, in which the entire circumference of the aperture is spaced from the edge of the blank.

15. A method of making a saw blade blank according to claim 1, in which a plurality of apertures are formed for respective inserts.

16. A method of making a saw blade blank according to claim 15, in which the apertures are regularly spaced along the blank.

17. A method of making a saw blade blank according to claim 15, in which the apertures are equally spaced from the edge of the blank.

18. A method of making a saw blade blank according to claim 15, in which the apertures are spaced by different distances from the edge of the blank, to allow composite teeth to be formed with cutting portions at different separations from the body of the blank.

19. A method of making a saw blade blank according to claim 18, in which the pitch of the apertures along the blank varies along the blank.

* * * * *